(No Model.)
C. H. HARRIS & R. C. CARPENTER.
GRADE LEVEL.
No. 305,183. Patented Sept. 16, 1884.
FIG. I.
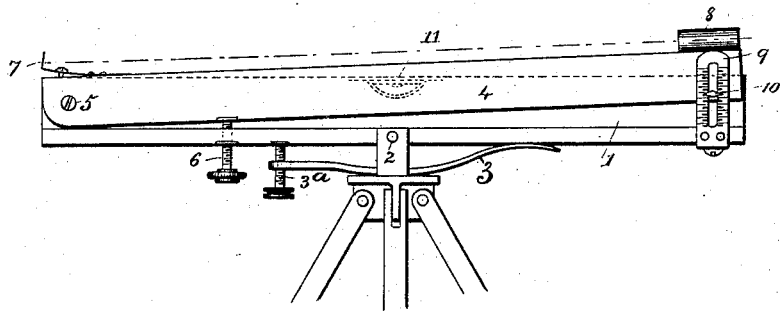
FIG. II.
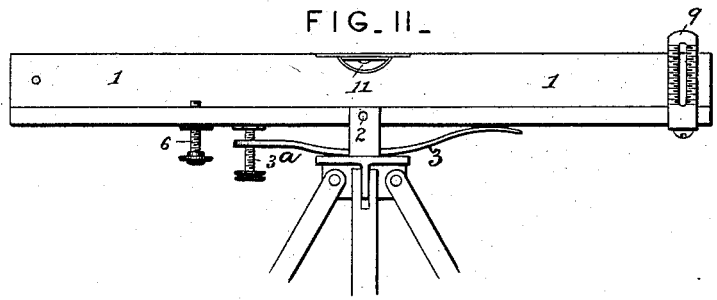
FIG. V.
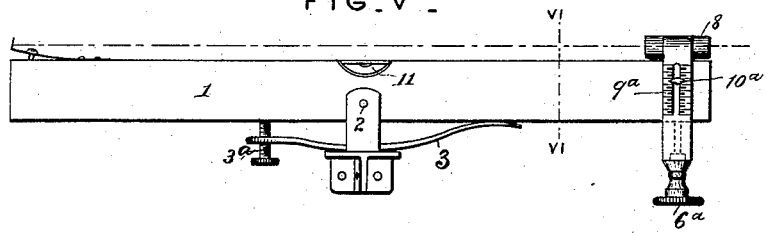
FIG. III.  FIG. IV.  FIG. VI.
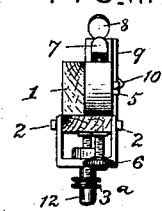 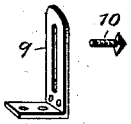 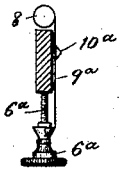
ATTEST.
Geo. T. Smallwood
Edward Starr
INVENTORS.
Caleb H. Harris
Rolla C. Carpenter.
By Knight Bros. attys
N. PETERS, Photo-Lithographer, Washington, D. C.

UNITED STATES PATENT OFFICE.

CALEB H. HARRIS AND ROLLA C. CARPENTER, OF JACKSON, MICHIGAN; SAID CARPENTER ASSIGNOR TO SAID HARRIS.

GRADE-LEVEL.

SPECIFICATION forming part of Letters Patent No. 305,183, dated September 16, 1884.

Application filed May 21, 1884. (No model.)

*To all whom it may concern:*

Be it known that we, CALEB H. HARRIS and ROLLA C. CARPENTER, both citizens of the United States, residing at Jackson, in the county of Jackson and State of Michigan, have invented certain new and useful Improvements in Grade-Levels, of which the following is a specification.

The object of the invention is to provide a cheap and simple form of level for engineering and other use. To this end we provide at each end of the level a "sight," one of said sights being fixed and the other adjustable vertically by means of a set-screw. A vertical scale fixed to the level or to the movable sight serves to guide said sight vertically and indicate the amount of grade by means of a relatively fixed pointer or index.

In order that our invention may be more fully understood, we will proceed to describe it with reference to the accompanying drawings, in which—

Figure I is a side elevation of our improved level in its preferred form. Fig. II is a similar view with grade-bar and sights removed. Fig. III is an end elevation of the instrument shown in Fig. I. Fig. IV is a detail view of the scale and index thereof. Fig. V is a side elevation of a modified form of the instrument. Fig. VI is a section on the line VI VI, Fig. V.

1 is the level-bar, pivoted at 2 to the frame of the instrument, and having means of adjustment to horizontal position. The adjusting mechanism consists of a plate-spring, 3, secured about its mid-length to the head of the tripod, and bearing at its extremities against the under side of the level bar on opposite sides of the pivot 2. One end of this spring bears directly against the bar 1, while the other is provided with a set-screw, $3^a$, whereby the said bar is leveled at will by the aid of a spirit or other level.

In Figs. I, II, and III, 4 is the "grade-bar" hinged at 5 to the level and having a set-screw, 6, for adjustment at an angle to the level-bar 1. 7 is a sight fixed to the forward end of the grade-bar at its pivotal point, so as to maintain a practically fixed relation to the level. 8 is a globe-sight fixed to the moving end of the grade-bar. 9 is a vertical scale fixed to the level and so arranged as to guide the grade-bar in a vertical path while serving to indicate the grade by means of index 10, fixed to said grade-bar. A common level-tube is shown at 11. 12 is the pin pivoting the level to its tripod.

In Figs. V and VI the grade-bar is dispensed with and the movable sight mounted upon the scale $9^a$, which in this case is adjusted by set-screw $6^a$. An index, $10^a$, fixed to the level, indicates the grade on scale $9^a$ in this form of the apparatus.

In operating the improved leveling-instrument, the level 1 is first adjusted to horizontal position, and the sight 8 being then elevated by means of screw 6 or $6^a$, the amount of grade per rod or hundred feet is shown by scale and index 9 10 or $9^a$ $10^a$.

Having thus described our invention, the following is what we claim as new therein and desire to secure by Letters Patent:

In a leveling-instrument, the combination of a suitable tripod, a level-bar pivoted thereto and provided with a spirit-level, a set-screw for adjustment and a graduated scale, and a grade-bar pivoted to said level-bar and provided with a fixed sight at each end and a set-screw for adjustment, substantially as and for the purpose set forth.

CALEB H. HARRIS.
ROLLA C. CARPENTER.

Witnesses:
LLEWELLYN FLEMING,
P. B. LOOMIS.